March 25, 1969      W. E. HART ETAL      3,434,211
SATELLITE TRACKING AND PLOTTING DEVICE
Filed Oct. 22, 1965

INVENTORS
WILLIAM E. HART
WILLIAM A. ALLEN
LESLIE L. CUNNINGHAM
BY AGENT
ATTORNEY

United States Patent Office 3,434,211
Patented Mar. 25, 1969

3,434,211
SATELLITE TRACKING AND PLOTTING DEVICE
William E. Hart, Berkshire, and William A. Allen, Clinton, Md., and Leslie L. Cunningham, Columbus, Ohio, assignors to the United States of America as represented by the Secretary of the Navy
Filed Oct. 22, 1965, Ser. No. 502,732
Int. Cl. G01c 21/24
U.S. Cl. 33—1
2 Claims

ABSTRACT OF THE DISCLOSURE

A hand held device through which the path of a satellite may be observed and traced in order to determine the observer's position on earth. Position is determined without the use of any electronics or apparatus aboard the satellite or on the ground. The device consists of transparent member and has a right ascension and declination grid-like system formed on a transparent material secured to it. Both the transparent member and the transparent material are held in an arcuate configuration by a support means.

---

Figure 1:
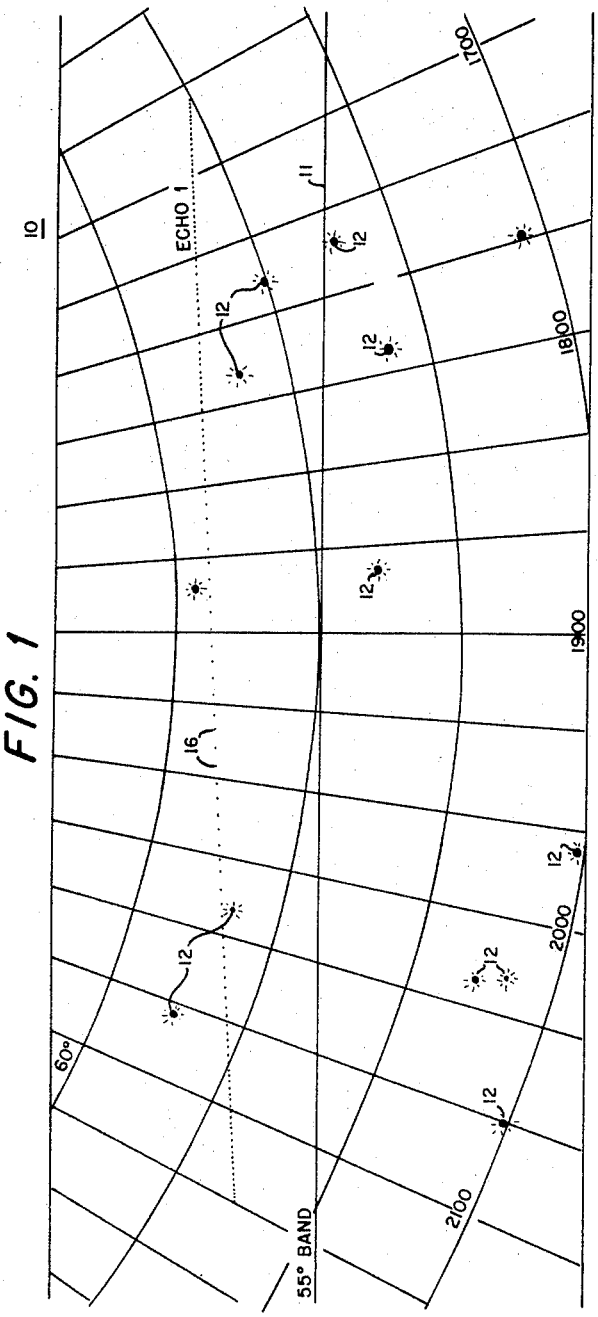

The invention described herein may be manufactured and used by or for the Government of the United States of America for governmental purposes without the payment of any royalties thereon or therefor.

The present invention relates to a position indicator system and more particularly to a device used in determining the location of an observer on the earth's surface through the method described in copending patent application Ser. No. 502,723, filed Oct. 22, 1965 through use of observations of orbiting earth satellites and by reference to the stars of the celestial sphere.

Heretofore expensive equipment has been used to determine positions for navigational and/or geodetic purposes through the use of orbiting satellites. Such equipment may be of a radiometric system which makes use of Doppler, radiometric ranging, or angular measuring systems. These systems depend on electronic equipment on the ground as well as within the satellite. Thus, any failure of the ground equipment, or satellite equipment including electronic components as well as batteries, makes the satellite and system a useless object and/or system in determining a desired position. Other equipment such as photogrammetric or optical systems depend upon expensive and delicately balanced ballistic cameras and therefore aboard ship a stabilized platform system, which aboard ship requires gyrostabilization. Thus, either of the former systems requires complex equipment which is not only costly but subject to failure of the many components that make up the systems. It is well recognized that any failure of the components aboard the satellite brings about a complete failure in the operation of this system since there is not a chance for repair or recovery of the equipment of the satellite.

The device of the present invention is a simple, inexpensive, hand-held device through which the satellite path and stars are observed and indicated onto a grid surface of the hand-held device. The hand-held device is a section of a transparent Gnomonic, Oblique Mercator, or similar projection of the right ascension and declination grid system. Hereinafter the phrase Mercator Projection will serve to represent any and all suitable projections which can be used for this purpose. The center line of the template and projection is made tangent to the satellite predicted great circle path. Stars a few degrees either side of and along the predicted satellite path are plotted onto the grid. The template is constructed in such a way that the observer needs only to orient the device for observing the satellite's path. This is done by superimposing the stars on the template with the actual stars in the heavens. The template is held in place and orientation maintained in any of a variety of modifications of the basic hand-held device. In this manner, similar to use of the hand-held sectant, the observer becomes the stabilized platform for the observing instrument.

It is therefore an object of the present invention to provide a relatively inexpensive device used for determining one's position on the earth's surface through observation of visible earth satellites.

Another object is to provide a device used for determining position by use of earth satellites which does not depend on an electrical output from the satellites.

Still another object is to provide a device used for determining one's position on the earth which is not dependent upon actual star identification.

Another object is to provide a device used for determining position on a ship as well as ashore.

While still another object is to provide a satellite shipboard positioning system which does not require an expensive stabilized platform.

Another object is to eliminate the necessity for extreme precision in recording each satellite observed position and to eliminate the need for recording extremely precise time for each observation and thereby eliminate the need for the associated precise expensive measuring and timing equipment.

Figure 2:
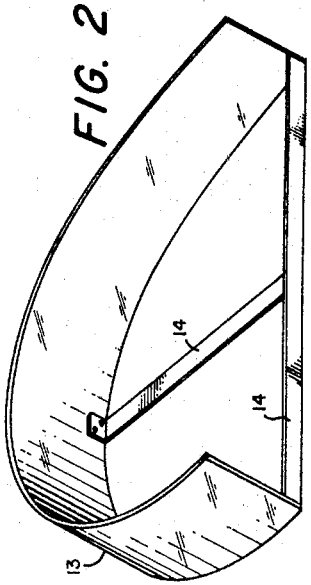

The nature of this invention as well as other objects and advantages thereof will be readily apparent from consideration of the following specification relating to the annexed drawings, in which:

FIG. 1 illustrates an Oblique Mercator projection grid of a certain area of the sky including specific stars used as a reference for tracking a satellite; and FIG. 2 illustrates a side view of the device used to plot the path of a satellite for determining one's position.

Now, referring to the drawings, there is shown by illustration instrumentation for carrying out the present invention. FIG. 1 represents a transparent Oblique Mercator projection 10 of the right ascension and declination grid of a particular sectional area of the sky. The center line 11 of the projection is made tangent to the satellite predicted great circle path and stars 12 a few degrees on either side of and along the predicted satellite path are plotted onto the grid.

FIG. 2 illustrates a device 13 upon which the projection is secured for observing a satellite in orbit and recording the track of the satellite. The device is made of a flat surface, clear plastic or some other suitable transparent material through which one may observe a satellite. The device is a section of cylinder shaped into an arc or a semicircular piece and held in the proper shape by use of suitable lightweight bars or brackets 14 of metal or other suitable relatively lightweight material having sufficient rigidity to maintain the device in a semicircular shape. The device must have sufficient width to provide a support for the Mercator projection grid. The support brackets are secured to the device in any conventient manner so that the brackets will not interfere with securing the Mercator projection grid thereon or interfere with the line of sight of an observer.

The device is used to track a satellite from which the position of the observer may be obtained. Since the sky background of stars is different as seen from different parts on the earth, an Oblique Mercator projection grid must be made for each of the many different sections of the sky in which one may observe a satellite. The proper grid is used so that the stars represented on the grid may be matched with the stars in the sky background by which the satellite will pass. The device is aligned with with the star background and as the satellite passes, the satellite's apparent positions are observed and recorded simultaneously on the grid. Also, the actual time of each recording of each of the observances is recorded. Thus, anyone desiring to determine their position on earth, may observe a satellite, record the path 16 on a Mercator or other suitable projection grid, and note the time of each observance and record the time of each observance.

In order to make a record of the satellite path, the grid must be placed on the inside surface of the semicircular transparent device 13 or on the side in which the viewer is located. In order to match up the stars represented on the grid with those of the sky, the observer must view the sky from the bracket side of the device which should be obvious from the use of the device.

The satellite's track 16 will be a smooth curve approximating a straight line and as many observations as possible should be recorded during one pass of the satellite. If the observations are few in number and spaced, the observer may draw a smooth line connecting the recorded points. From the recorded times of the actual observations that are plotted, the observer may fit a time scale to the whole newly plotted and adjusted smooth curve. Right ascension and declination values are then scaled off the grid for all observation points. The observer may use any time intervals for scaling. Since a satellite pass from horizon to horizon is about 15 to 20 minutes, at maximum, a scaling time interval of 15 seconds will provide 60 to 80 data points. The device is constructed in such a manner that actual star identification is not needed and as illustrated above only a few actual observations are actually required since positions may be filled in on the grid.

The satellite track may be obtained by use of a camera as well as individual personal sightings. The camera used in obtaining a picture of the satellite track must be a fast-speed camera such that definite positions of the satellite can be determined. After the satellite track has been taken on film, the film is developed and the negatives are put into an enlarging projector. The film image is then projected onto a Mercator or other suitable projection grid in which the Mercator projection grid has the star arrangement of the area in which the pictures were taken. The image starts on the photographs are oriented with the stars on the grid and then the satellite image from the oriented film image is traced directly onto the Mercator projection grid. If necessary, adjustment in scaling of the satellite track may be carried out as described above.

In making use of the device of the present invention, observations are made at night when a satellite illuminated by reflected sunlight can be seen against a star background. An observer is required to record timed positions of the satellite, relative to the star background as many times as possible, during one pass of the satellite across the horizon. In order to make the observations and record the satellite line of travel, a transparent Oblique Mercator projection of the right ascension and declination grid with the proper star background must be used. The stars of the grid are matched with the stars in the sky and then the observed path of the satellite is indicated on the grid simultaneously with the recording of the time of the recorded observation. In determining the actual position of an observer by use of the orbiting satellite path, information must be known of the position in latitude and longitude as well as the altitude of the satellite. This information is readily available on the major satellites orbited by the United States through the National Aeronautics and Space Administration. Thus by having readily available information such as ephemerides of satellite position predictions and orbit parameters available from NASA or other Government agencies such information may be used to determine the position of an observer. Since the observer has orbital parameter information as well as the ephermerides list, at one-minute intervals (GMT), the satellite predicted subpoint position in latitude and longitude and its altitude above the ellipse, in this form may be readily converted to right ascension and declination for the exact instant of time of each observation.

It can be seen that the present invention is conceptually simple and a relatively inexpensive device used for satellite marine navigation and geodesy.

Obviously many modifications and variations of the present invention are possible in the light of the above teachings.

What is claimed is:

1. In a device for plotting the path of a satellite onto a transparent projection of a right ascension and declination grid to determine position which comprises in combination:

a flat, smooth surface, transparent, vertically extending member held in an arcuate shape, support means secured to said transparent member to hold said member in a desired arcuate configuration and for positioning said member when in use, a transparent material, said transparent material including a right ascension and declination grid-like system of lines thereon with a center line tangent to a predicted great circle path of a satellite and with known stars plotted onto the transparent material a few degrees on each side and along the predicted path of the satellite, said transparent material being secured to said transparent member for aligning the plotted stars with the actual stars in the heavens and for plotting the path of an observed satellite as it passes through the area observed.

2. A device as claimed in claim 1, wherein the shape of said transparent member is such that the path of satellite plotted onto said grid held in place by said transparent member is in a straight line.

References Cited

UNITED STATES PATENTS

| | | |
|---|---|---|
| 1,160,096 | 11/1915 | Cruset. |
| 2,460,346 | 2/1949 | Hagner. |
| 3,045,363 | 7/1962 | Kaestle. |
| 3,169,319 | 2/1965 | Hoffmeister. |

FOREIGN PATENTS

| | | |
|---|---|---|
| 414,308 | 8/1934 | Great Britain. |

HARRY N. HAROIAN, *Primary Examiner.*

U.S. Cl. X.R.

33—61